(12) United States Patent
Drennen et al.

(10) Patent No.: US 7,673,725 B2
(45) Date of Patent: Mar. 9, 2010

(54) DISC BRAKE SYSTEM

(76) Inventors: David B. Drennen, 4303 Brewsters Run Ct., Bellbrook, OH (US) 45305; Paul Rymoff, Jr., 3230 Ferry Rd., Bellbrook, OH (US) 45305

(*) Notice: Subject to any disclaimer, the term of this patent is extended or adjusted under 35 U.S.C. 154(b) by 244 days.

(21) Appl. No.: 11/713,840

(22) Filed: Mar. 5, 2007

(65) Prior Publication Data
US 2008/0217124 A1 Sep. 11, 2008

(51) Int. Cl.
F16D 65/12 (2006.01)
F16D 65/10 (2006.01)

(52) U.S. Cl. .............................. 188/218 XL; 188/18 A
(58) Field of Classification Search ........... 188/218 XL, 188/218 R, 18 A
See application file for complete search history.

(56) References Cited

U.S. PATENT DOCUMENTS

| | | | | |
|---|---|---|---|---|
| 3,542,166 A | * | 11/1970 | Harrison | 188/218 XL |
| 4,002,227 A | * | 1/1977 | Simon | 188/18 XL |
| 4,848,526 A | * | 7/1989 | Fargier et al. | 188/71.5 |
| 5,297,660 A | * | 3/1994 | Wiebelhaus et al. | 188/218 XL |
| 7,374,023 B2 | * | 5/2008 | Yamamoto | 188/18 A |

FOREIGN PATENT DOCUMENTS

DE 4114090 A1 * 11/1992
EP 127932 A1 * 12/1984

* cited by examiner

*Primary Examiner*—Melody M Burch
(74) *Attorney, Agent, or Firm*—Dickinson Wright PLLC; William H Honaker

(57) ABSTRACT

A disc brake system comprises a mounting hub and at least one disc supported by the mounting hub. The mounting hub has a center portion and an outer portion substantially perpendicular to the center portion and defines a central axis extending perpendicular to the center portion. A plurality of grooves comprising a U-shape are defined within the outer portion and are spaced radially about the central axis. Each of the grooves extends axially relative to the central axis. A bearing is disposed in each of the plurality of grooves and operatively connects the mounting hub and the disc such that the bearing rotates about a bearing axis and moves axially within the groove in response to axial movement of the disc.

13 Claims, 3 Drawing Sheets

DISC BRAKE SYSTEM

BACKGROUND OF THE INVENTION

1. Field of the Invention

The subject invention relates to a disc brake system, and more specifically to a disc brake system that allows discs to freely slide axially when a braking force is applied to the disc.

2. Description of the Prior Art

Various disc brake systems are known to those of ordinary skill in the art. Currently, production vehicles such as automobiles often have spot-type disc brake systems that have a fixed disc and a caliper configuration with an inboard piston and cylinder operated by hydraulic fluid. The caliper is bolted to a suspension member either forward or rearward with respect to a vertical plane through a wheel axle and includes a slidable bridge sliding on pins with an outer brake, or friction, pad on the outboard end of the bridge. Operation of the brake pedal forces the piston outwardly to engage and to slide an inner brake pad along the bridge into frictional braking engagement with the inner side of the fixed disc, which is rigidly fixed to a hub on which the wheel is mounted. A reaction force on the slidable bridge causes it to slide on the pins and force the outer brake pad tightly against the outer side of the fixed brake disc. Deceleration of the clamped disc and its associated hub and its attached wheel thereby decelerates the vehicle. As the piston is forced to slide to engage the brake pads with the fixed disc, an internal O-ring seal between the cylinder and the piston is compressed, and energy is stored therein which is released, when the braking fluid pressure is relieved, to slide the piston in the reverse direction to its off brake position in the cylinder.

The above-described disc brake system is commonly referred to a conventional, fixed disc brake system because the system has a disc that is fixed to a hub of a wheel. Previously it was believed that slidable brake disc systems were unable to meet the rigorous, demanding criteria to the satisfaction of automobile manufacturers or suppliers. Vehicle manufacturers and brake suppliers undertake the risk of product liability lawsuits or product recalls and, therefore, are reluctant to adopt a new braking system unless it has superior qualities such as improved cost, weight, efficiency, longevity or other qualities relative to the standard fixed disc brake Generally, the fixed brake disc systems are quite heavy and a reduction in weight is a desirable goal for the slidable disc brake system. In addition to size, cost and weight, there are the criteria of efficiency, proficiency, and longevity. Brake wear is a longevity problem and a longer brake pad life and brake disc life are desired by vehicle manufacturers which are increasingly providing long term service warranties for their vehicles, as well as for the vehicle owner who ultimately pays for brake replacement in one manner or the other. Still another problem is that some fixed disc brake systems have noise problems which are cured to a certain extent by the addition of noise suppressors, which add to the size, weight, and cost of the system. Brake systems must be free of rattles and should be free of noise. In addition to above, there also may occur a "feel" problem where the driver experiences a long or deep pedal depression when operating the brakes.

Another common disc brake system is referred to as sliding brake disc system. It is to be appreciated that in the sliding brake disc system, the disc must slide axially on the hub between an off-brake position, where the residual torque should be low and a braking position where the torque is high, and then return to the off-brake position to reduce the residual torque. The sliding connection between the brake disc and hub must be free to move despite being subjected to corrosive conditions and over a long period of use. If either disc is not able to freely slide, the system will not meet braking expectations. The slidable brake disc must not be noisy or squeal under low and high temperature conditions, and it must not wobble or generate dust or produce vibrations that the driver can feel or hear. The caliper system for sliding brake systems incorporates the piston that pushes an inboard disc into an outboard disc which generates four friction surfaces.

Prior sliding brake systems have included spline grooves oversized relative to a size of the disc teeth inserted into the grooves and spring devices where mounted on the hub to push the discs to rotate a driving side, flank of each tooth into mating engagement with a flank of the oversized spline groove. The oversized notches were used to prevent the previously heated and now cooled disc from jamming in the splines. To eliminate "knock back" and chattering, springs were inserted into the spline notches to bias the spline flanks on the disc and hub into engagement with one another. Such designs do not provide a good drive connection between the discs and the splined hub. The clearance between the hub and disk is a design problem, too much clearance will result in chatter during certain driving conditions and minimal clearance will result in a binding condition. Another issue encountered by these systems is that road debris, such as dirt, sand, or rocks, may lodge in the splines and interfere with the sliding of the discs.

From the foregoing, it will be seen that there is a need for a better, slidable disc mounting system that is more efficient and that does not generate noise or squeal as the discs expand at high temperatures and that does not wobble at high braking loads.

SUMMARY OF THE INVENTION AND ADVANTAGES

The subject invention provides a disc brake system. The disc brake system generally comprises a mounting hub and at least one disc supported by the mounting hub. The mounting hub has a center portion defining a central axis and an outer portion extending substantially perpendicular and axially relative to the center portion. The outer portion of the mounting hub includes a plurality of grooves each presenting sides and at least one closed end defining a U-shape. The grooves are spaced radially about the central axis. Each of the grooves extends axially relative to the central axis. A bearing is disposed in each of the plurality of grooves and operatively connects the mounting hub and the disc such that the bearing rotates about a bearing axis and engages the sides of the corresponding groove as the bearing moves axially within the groove in response to axial movement of the disc relative to the mounting hub.

The subject invention overcomes the inadequacies that characterize the related art disc brake systems. Specifically, the addition of the rotatable bearing reduces friction and helps eliminate the binding between the disc and the hub. Additionally, the bearing is able to accept some preload and the clearance in the hub and rotor connection can be reduced thereby reducing chatter and binding. Rotation forces are less than sliding forces which meets and improves the braking expectations. Further, the design of such a system of the subject invention is simplified by eliminating springs and clips that were used to ensure a connection between the disc and hub.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
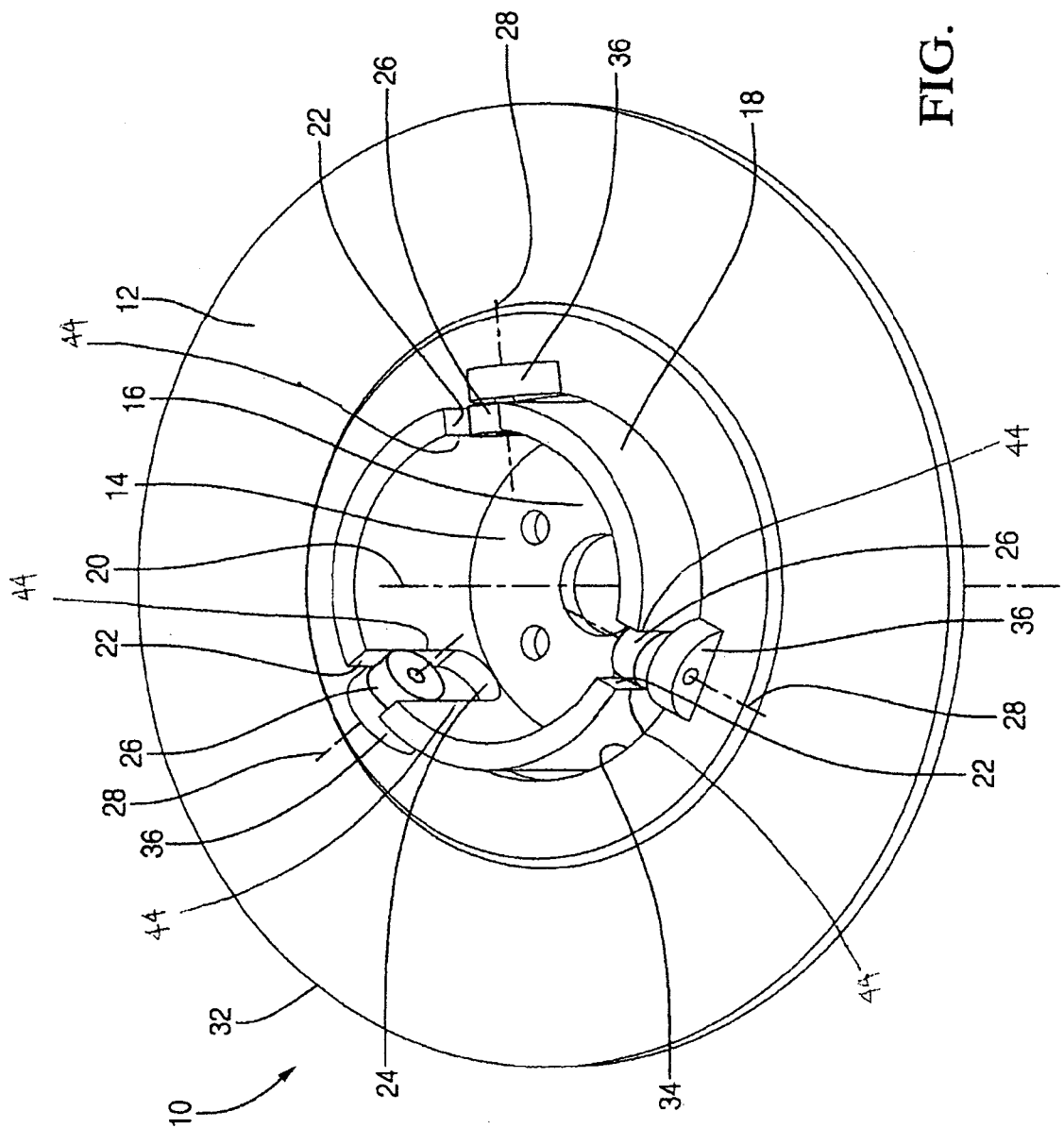
FIG. 1 is a perspective view of a disc brake system according to the subject invention.

Referring to the Figures, wherein like numerals indicate corresponding parts throughout the several views, a disc brake system is shown generally at 10 in FIG. 1. The brake system 10 of the subject invention finds particular use on a vehicle (not shown), and more specifically for use on a front wheel drive vehicle. However, it is anticipated that the subject invention can be used in other applications than vehicles. In a front wheel drive vehicle, the weight of the vehicle is concentrated at the front of the vehicle and more brake torque is applied to the front wheels than is applied to the rear wheels. The vehicle may also have the brake system 10 embodying the subject invention on the rear wheels or the rear wheel may have other conventional braking systems.

The disc brake system 10 according to the subject invention relates to a slidable disc brake. The brake system 10 can have either one disc 12 or two or more discs 12 such as a pair of discs 12 (shown in FIG. 3). The disc brake system 10 generally comprises mounting hub 14 and at least one disc 12 extending radially from the mounting hub 14. The mounting hub 14 has a center portion 16 and an outer portion 18 extending substantially perpendicular and axially relative to the center portion 16. The term "substantially perpendicular" generally indicates that the outer portion 18 may extend at more or less than ninety degrees from the center portion 16. The center portion 16 of the mounting hub 14 also defines a center axis 20 extending perpendicular relative to the center portion 16.

Figure 2:
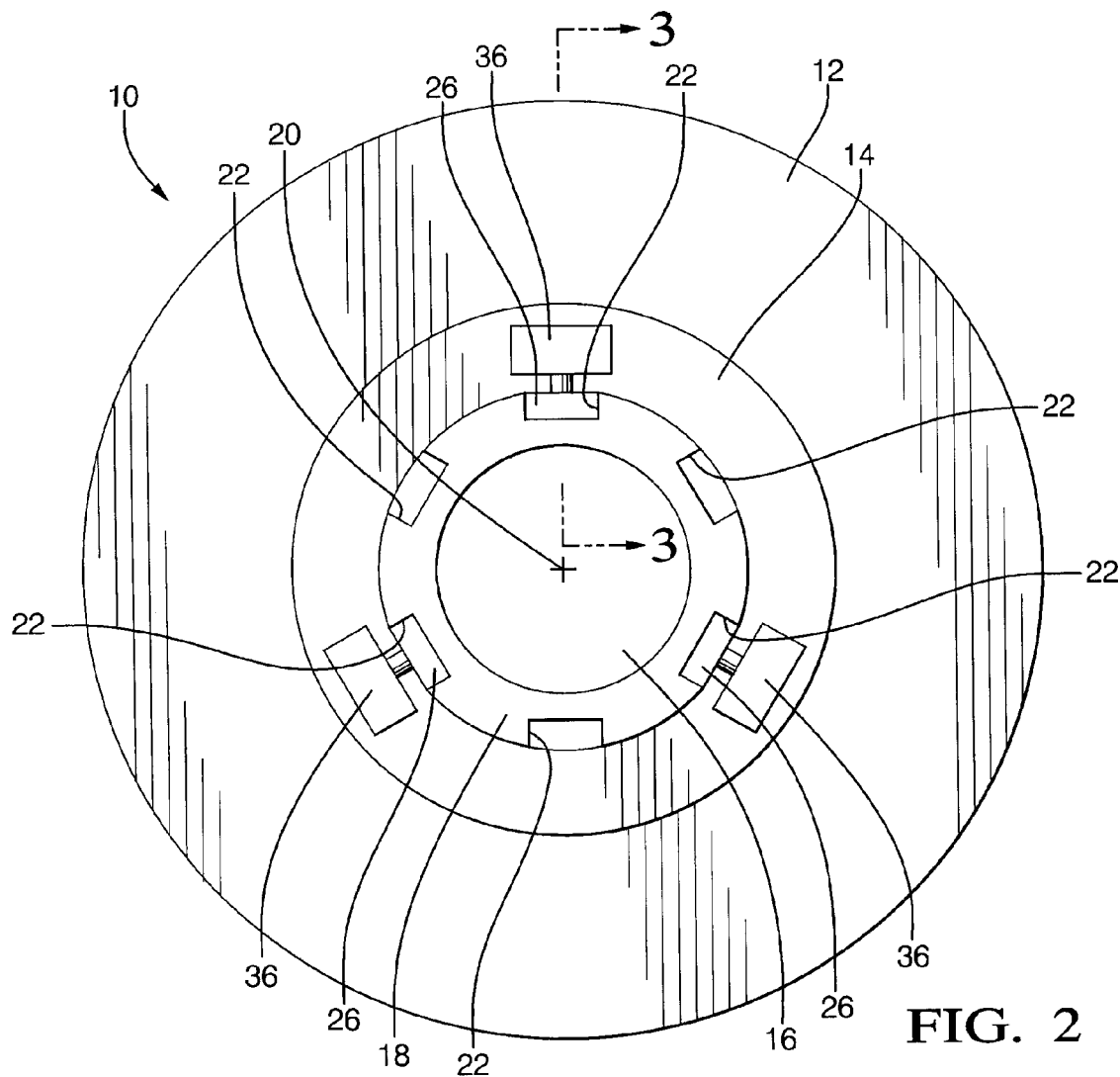
FIG. 2 is a top view of the disc brake system shown in FIG. 1.

A plurality of grooves 22 are defined within the outer portion 18 of the mounting hub 14. Each of the grooves 22 presents sides 44 and at least one closed end 24 so that each of the grooves 22 defines a U-share, as shown in FIG. 1. The grooves 22 may extend partially through the hub 14. In other words, the grooves 22 may not extend the entire width of the hub 14. The grooves 22 are spaced radially about the central axis 20 and each of the grooves 22 extend axially relative to the central axis 20. In one embodiment, the plurality of grooves 22 are equally spaced from one another. However, the disc brake system 10 may include the plurality of discs 12 supported in different grooves 22. Referring to FIG. 2, a top view of the disc brake system 10 is illustrated having a first set of grooves 22 and a second set of grooves 22. In other words, if the disc brake system 10 has two discs 12 and the hub 14 has six grooves 22, three grooves 22 may support one disc 12 and the other three grooves 22 may support the other disc 12.

Referring back to FIG. 1, the subject invention further comprises a bearing 26 disposed in each of the plurality of grooves 22 and operatively connected to the mounting hub 14 and the disc 12. The bearing 26 rotates about a bearing axis 28 and engages the sides 44 of the corresponding groove 22 and moves axially within the groove 22 in response to axial movement of the disc 12 relative to the mounting hub 14. Said another way, as the disc 12 slides axially along central axis 20, the bearing 26 rotates about the bearing axis 28, which allows the disc 12 to slide freely. The bearing 26 reduces the friction as the disc 12 slides and also provides a smoother braking operation for the user. Preferably, each disc 12 is supported by a plurality of bearings 26 in the hub 14 such that each of the discs 12 is operatively connected to at least one of the bearings 26. In FIG. 1, the disc 12 is shown connected to three bearings 26 that are disposed in three grooves 22. It is to be appreciated that greater or fewer bearings may be used depending upon the amount of braking forces that are encountered.

Another advantage of incorporating the bearing 26 into the disc brake system 10 is improved heat and wear resistance. Unlike the related art sliding discs, the subject invention can withstand high temperatures with limited fusing or metal bonding to the hub 14 and also experiences reduced wear on the disc 12. The subject invention is also more resistant to corrosion since the bearing 26 rotates as opposed to slides within the grooves 22. In another embodiment, the bearing 26 is further defined as a roller bearing and in still another embodiment; the rolling bearing is further defined as a needle bearing. It is to be appreciated by those of ordinary skill in the art that various types of bearings may be used, so long as the bearing 26 can rotate within the groove 22 and support the braking forces applied to the discs 12.

Figure 3:
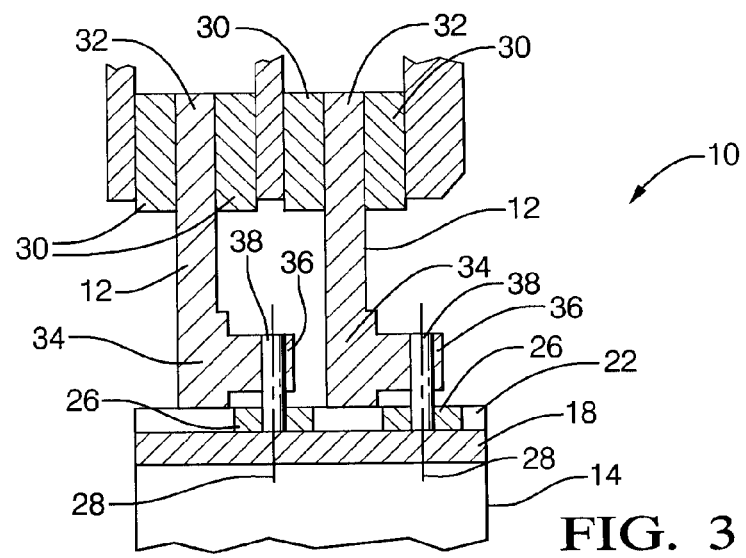
FIG. 3 is a cross-sectional view of another embodiment of the disc brake system including a plurality of discs and a plurality of frictional pads interacting therebetween.

FIG. 3 is a cross-sectional view of another embodiment of the disc brake system 10 including the plurality of discs 12 and a plurality of frictional pads 30 interacting therebetween. The disc 12 has a first end 32 engaging at least one friction pad 30 and a second end 34 having a boss 36 for rotatably supporting the bearing 26. It is to be appreciated that various types of well known calipers may be used to urge the discs 12 into contact with the frictional pads 30 without limiting the subject invention. A post 38 rotatably interconnects the boss 36 and the bearings 26. Various different configurations may be used to interconnect the bearings 26 with the disc 12 and the embodiments shown are for illustrative purposes only. For example, the boss 36 may remain outside of the grooves 22 as illustrated. Alternatively, the post 38 may not rotate relative to the disc 12, so long as the connection between the bearing 26 and the disc 12 is sufficient to absorb the braking forces applied to the disc 12.

Figure 4:
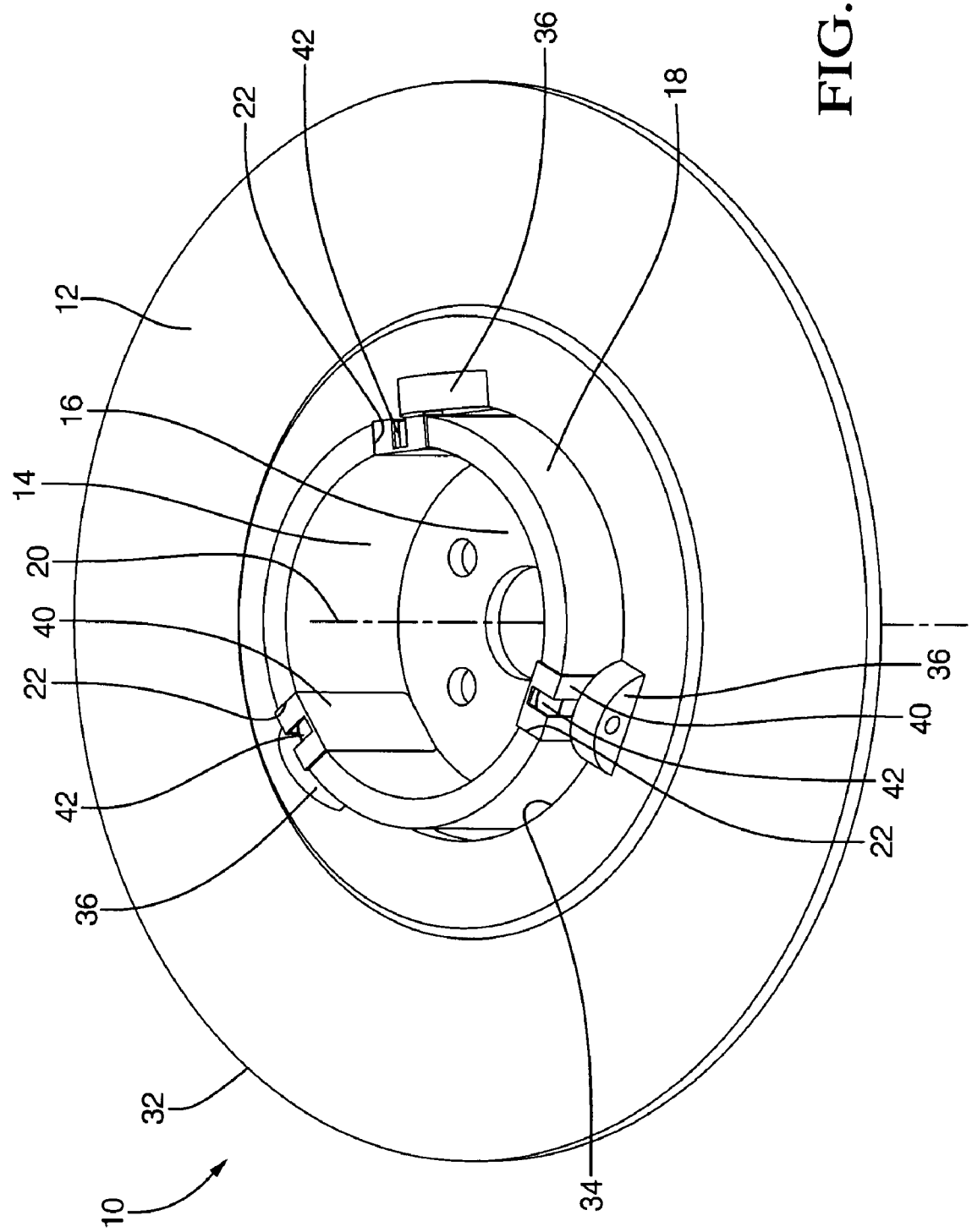
FIG. 4 is another perspective view the disc brake system of FIG. 1 including encasements.

Yet another advantage of the subject invention is that there is increased protection from road debris being lodged into the grooves 22 since the bearing 26 rotates as opposed to slides within the grooves 22. Referring to FIG. 4, an encasement 40 is illustrated enclosing each of the grooves 22. The bearings 26 are disposed within the encasement 40 to prevent road debris, such as dirt, sand, or rocks, from getting lodged into the grooves 22. The encasement 40 includes a slot 42 disposed in one surface for receiving the post 38 that interconnects the bearing 26 to the disc 12 and to allow for free movement therebetween.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A disk brake system comprising:
a mounting hub having a center portion defining a central axis and an outer portion extending substantially perpendicular and axially relative to said center portion;
at least one disc extending radially from said mounting hub;
said outer portion of said mounting hub including a plurality of grooves each presenting sides and at least one closed end defining a U-shape and spaced radially about said central axis and each of said grooves extending axially relative to said central axis; and
a bearing disposed in each of said plurality of grooves operatively connecting said mounting hub and said at least one disc such that said bearing rotates about a bearing axis and engages said sides of said corresponding groove and moves axially within said corresponding groove in response to axial movement of said at least one disc relative to said mounting hub.

2. A disc brake system as set forth in claim 1 wherein said bearing is further defined as a roller bearing.

3. A disc brake system as set forth in claim 1 wherein said bearing is further defined as a needle bearing.

4. A disc brake system as set forth in claim 1 wherein said plurality of grooves are further defined as equally spaced from one another.

5. A disc brake system as set forth in claim 1 wherein each of said grooves are further defined as having at least one closed end such that said groove extends partially through said hub.

6. A disc brake system as set forth in claim 1 wherein said at least one disc further comprises a first end engaging at least one friction pad and a second end having a boss for rotatably supporting said bearing.

7. A disc brake system as set forth in claim 6 further comprising a post rotatably interconnecting said boss and said bearing.

8. A disc brake system as set forth in claim 7 further comprising an encasement enclosing each of said grooves such that said bearings are disposed therein.

9. A disc brake system as set forth in claim 8 wherein said encasement further defines a slot disposed in one surface for receiving said post.

10. A disc brake system as set forth in claim 1 further comprising an encasement enclosing each of said grooves such that said bearings are disposed therein.

11. A disc brake system as set forth in claim 1 wherein said at least one disc comprises a plurality of discs.

12. A disc brake system as set forth in claim 11 wherein said bearing comprises a plurality of bearings associated with each of said plurality of discs such that each of said discs is operatively connected to at least one of said bearings.

13. A disk brake system comprising:
a mounting hub having a center portion defining a central axis and an outer portion extending substantially perpendicular and axially relative to said center portion;
at least one disc extending radially from said mounting hub;
said outer portion of said mounting hub including a plurality of grooves each presenting sides and at least one closed end defining a U-shape and spaced radially about said central axis and each of said grooves extending axially relative to said central axis;
a bearing disposed in each of said plurality of U-shaped grooves operatively connecting said mounting hub and said disc such that said bearing rotates about a bearing axis and engages said sides of said corresponding U-shaped groove and moves axially within said corresponding groove in response to axial movement of said at least one disc relative to said mounting hub;
a boss extending axially from said at least one disc for supporting said bearing; and
a post extending radially along said bearing axis for interconnecting said boss and said bearing.

* * * * *

UNITED STATES PATENT AND TRADEMARK OFFICE
CERTIFICATE OF CORRECTION

PATENT NO. : 7,673,725 B2  Page 1 of 1
APPLICATION NO. : 11/713840
DATED : March 9, 2010
INVENTOR(S) : David B. Drennen and Paul Rymoff, Jr.

It is certified that error appears in the above-identified patent and that said Letters Patent is hereby corrected as shown below:

column 3, line 45: "U-share" should be -- U-shape --

Signed and Sealed this

Thirteenth Day of July, 2010

David J. Kappos
*Director of the United States Patent and Trademark Office*